United States Patent [19]

Ornsteen

[11] 4,033,484
[45] July 5, 1977

[54] HOT MELT CARTRIDGE ADHESIVE GUN

[75] Inventor: Robert L. Ornsteen, Cape Neddick, Maine

[73] Assignee: Ornsteen Chemicals, Inc., Seabrook, N.H.

[22] Filed: Jan. 29, 1976

[21] Appl. No.: 653,598

Related U.S. Application Data

[63] Continuation-in-part of Ser. No. 562,212, March 26, 1975, abandoned.

[52] U.S. Cl. .......................... 222/146 HE; 222/391
[51] Int. Cl.² ............................................ B67D 5/62
[58] Field of Search ........ 222/146 R, 146 HE, 391, 222/327, 326

[56] References Cited
UNITED STATES PATENTS

| | | | |
|---|---|---|---|
| 2,732,102 | 1/1956 | Ekins | 222/327 |
| 3,877,610 | 4/1975 | Dickey | 222/146 HE |

*Primary Examiner*—Stanley H. Tollberg
*Attorney, Agent, or Firm*—Weingarten, Maxham & Schurgin

[57] ABSTRACT

A hot melt adhesive gun employing a cartridge of thermoplastic adhesive contained within a chamber made of a thermally insulative non-stick material. A plunger is driven into engagement with the cartridge by a manually operative trigger actuated infinite resolution ratchet to urge the cartridge into melting contact with an electrical heater block and to provide pressure for driving the melting adhesive into a storage reservoir and out through a valved nozzle for application to a bonding surface. A partially melted portion of the cartridge deforms under the applied pressure of the plunger to form a seal against backflow of molten adhesive. Upon release of the trigger, a retraction mechanism causes the plunger to retract a predetermined amount to disengage the cartridge thereby allowing closure of the nozzle valve and arresting of adhesive flow.

13 Claims, 7 Drawing Figures

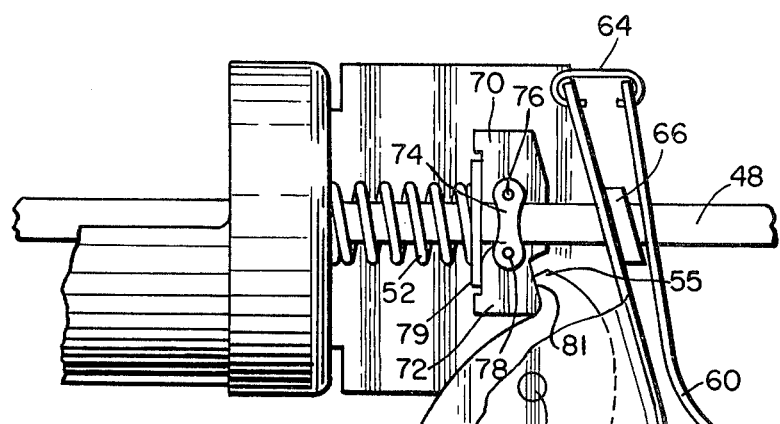
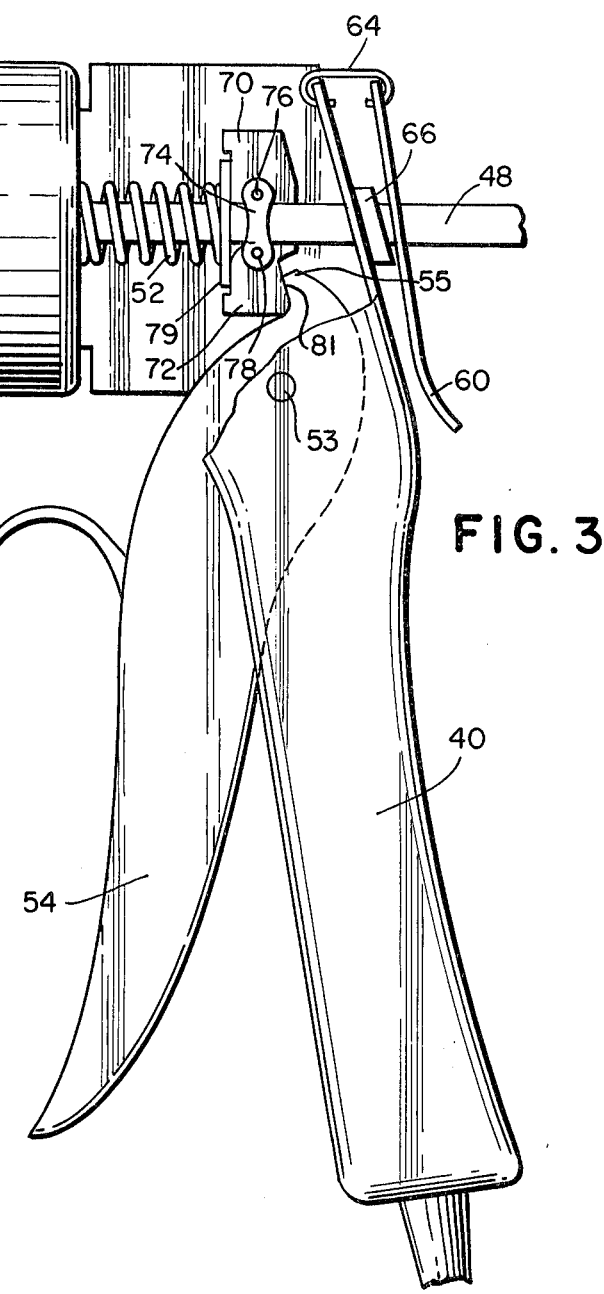
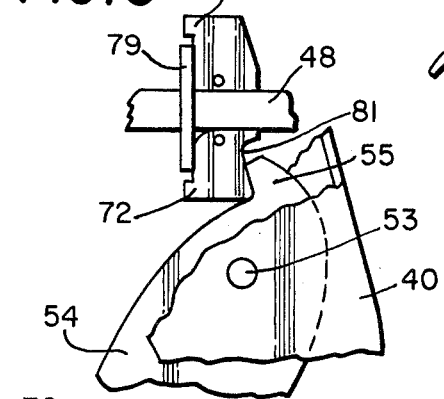
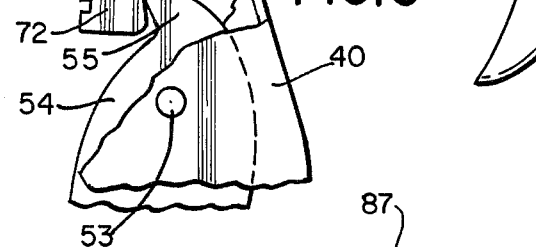
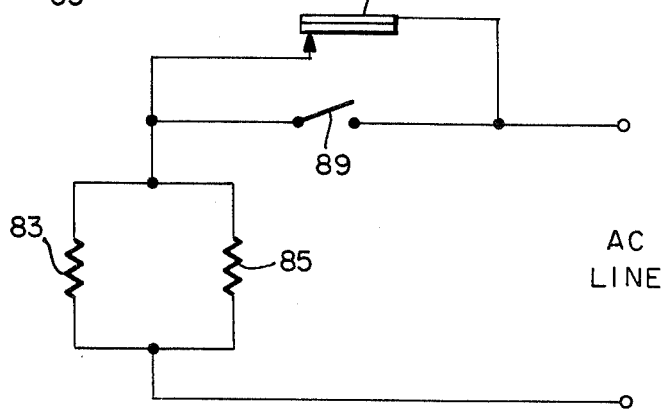

HOT MELT CARTRIDGE ADHESIVE GUN

CROSS REFERENCE TO RELATED APPLICATION

This is a continuation-in-part of previously filed U.S. patent application Ser. No. 562,212, filed Mar. 26, 1975, now abandoned.

FIELD OF THE INVENTION

This invention relates to adhesive dispensing apparatus and more particularly to a hot melt adhesive gun employing a cartridge of normally solid thermoplastic adhesive which in a molten state is applied to a work surface.

BACKGROUND OF THE INVENTION

Hot melt adhesive guns are known for application of melted thermoplastic adhesive onto a work surface on which the adhesive solidifies to form a required bond. In one known type of hot melt adhesive gun which is substantially manual in operation, the front end of a meltable stick of solid adhesive is inserted into a chamber and forced into engagement with an electrically heated plate as the operator presses with his thumb on the back of the stick. The stick is melted and liquid adhesive flows out of the gun through a nozzle onto a bonding surface. To stop the flow of adhesive, the operator must pull back on the stick to disengage it from the heater plate.

Although such manually operated types of hot melt adhesive guns are quite simple in design and can be used anywhere there is a source of standard electrical power for energizing the heater, the quantity of adhesive present in the stick is limited and is not sufficient for many industrial applications. The stick of adhesive is also subject to breakage, such as by lateral pressure by the operator, which detracts from the overall utility of the gun.

Another type of known hot melt guns usually employed in industrial applications employs a cartridge of normally solid thermoplastic adhesive contained within a chamber in which the cartridge or portion thereof is heated and melted and by pneumatic action urged through a pneumatically valved nozzle for dispensing onto the work surface. A particularly effective gun of this type is the subject of copending patent application Ser. No. 438,730, filed Feb. 1, 1974, now U.S. Pat. 3,877,610, assigned to the assignee of this invention. Such pneumatically operative guns of course require a source of pressurized air or other generating gas which limits their portability and are relatively expensive. Although very useful, for heavy duty high volume applications, there is a need for a hot melt adhesive gun more suited to relatively light duty low volume usage and in situations where it is considered useful to have a completely portable gun.

SUMMARY OF THE INVENTION

In accordance with the present invention, a hot melt adhesvie gun is provided which employs a cartridge of thermoplastic adhesive contained in a chamber and against which a plunger is engaged through an infinite resolution ratchet upon the manual actuation of a trigger for urging the cartridge into melting contact with a heater block and to provide pressure for urging the melted adhesive into a storage reservoir in the heater block and out through a valved nozzle for application to a bonding surface. The use of an infinitely resolvable ratchet provides continuous forward motion of the plunger and corresponding continuous pressure on the cartridge as the trigger is depressed, to force liquid adhesive out of the gun in a steady stream for so long as the trigger is actuated. A partially melted portion of the cartridge deforms under the pressure of the plunger to form a seal against backflow of the molten adhesive. The forward travel of the plunger is limited so that the plunger never comes in contact with melted or partially melted adhesive and therefore remains free of molten adhesive.

Upon release of the trigger, a retracting mechanism causes the plunger to retract a predetermined amount to disengage the cartridge thereby dropping system pressure and allowing the valve to close and arrest the flow of adhesive. The flow of adhesive is stopped at substantially the same time as release of the trigger to minimize wasteful and messy dripping. The retraction mechanism allows the plunger to retract far enough to relieve any residual pressure remaining in the system. Although this residual pressure may be insufficient to open the nozzle valve, it may cause the partially melted cartridge portion to extrude back through the clearance space between the cartridge and the gun chamber wall. The heater block is made of a material such as aluminum, having good thermal conductivity and thermal mass such that the heat stored in the heater block tends to maintain the quantity of adhesive in the reservoir in a liquid state. As soon as the trigger is actuated and pressure thereby applied to the cartridge, the supply of already melted adhesive in the reservoir is available for immediate dispensing to a bonding surface.

The infinitely resolvable ratchet includes in one embodiment a pair of pivotally mounted gripping blocks which provide large area bearing contact with the confronting surfaces of the plunger. The gripping blocks are actuated by the manually operable trigger and the gripping force is dependent upon the force exerted on the trigger. Since a large area gripping contact is maintained between the gripping blocks and the plunger, there is little potential for wear of the plunger rod. The gun can also include an electrical switch closed upon actuation of the trigger and operative to bypass the thermostat of the heater control circuit to provide continuous power to the heater during adhesive dispensing.

DESCRIPTION OF THE DRAWINGS

The invention will be more fully understood from the following detailed description taken in conjunction with the accompanying drawings in which:

FIG. 3 is a partially sectional elevation view of an alternative embodiment of the present invention;

FIG. 4 is a schematic diagram of the heater control circuit useful in the invention. FIG. 5 is a partially sectional detailed elevation view of the embodiment of FIG. 3 in the rest position; and FIG. 6 is a partially sectional detailed elevation view of the embodiment of FIG. 3 in the gripping position.

DETAILED DESCRIPTION OF THE INVENTION

Figure 1:
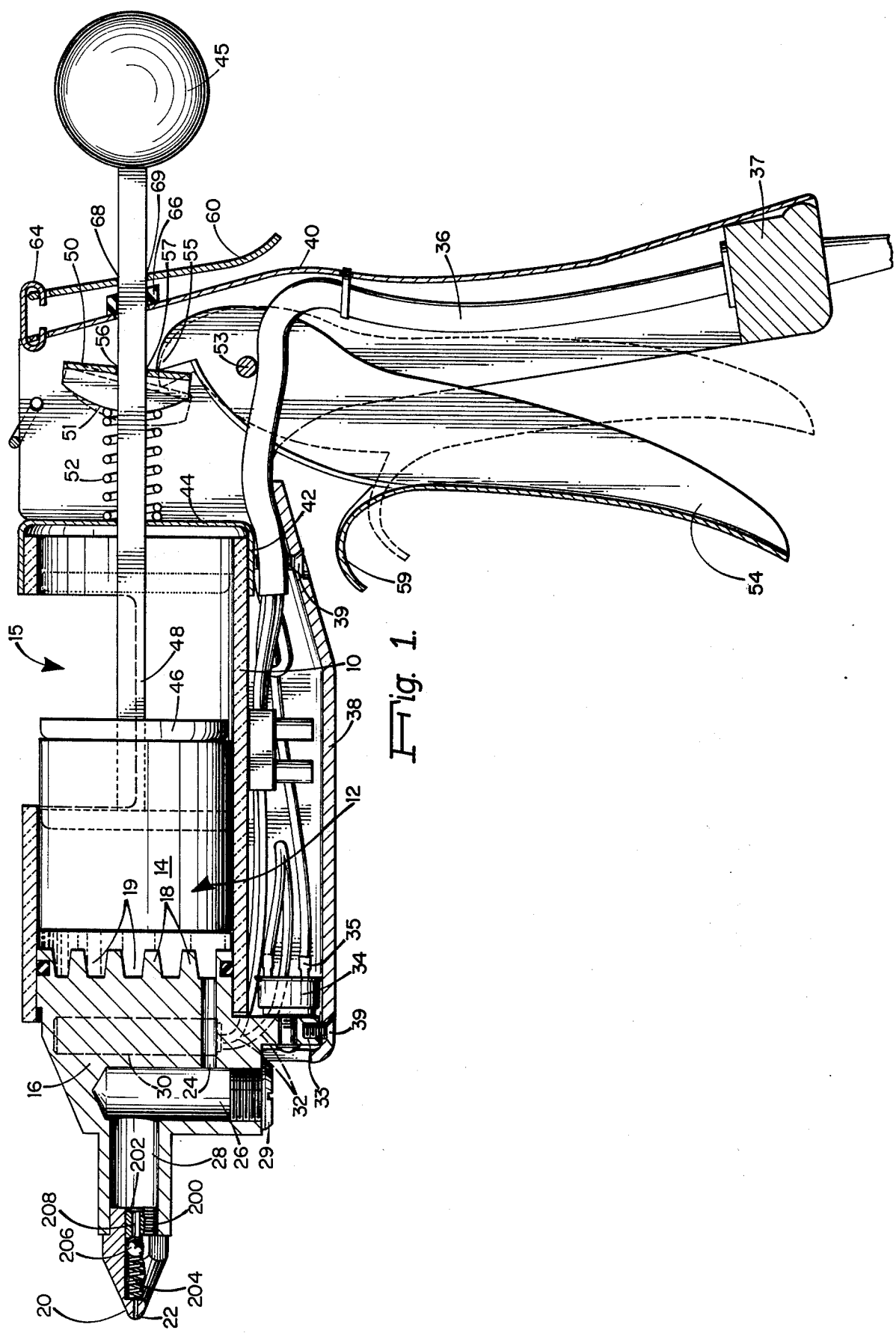
FIG. 1 is a partially sectional elevation view of an adhesive gun of the present invention.

Referring to FIG. 1, there is shown a hot melt adhesive gun having an elongated hollow cylindrical gun housing 10 defining a cylindrical chamber 12 in which a cartridge 14 of thermoplastic adhesive is contained for melting and subsequent dispensing from the valved gun nozzle onto a work surface. An opening 15 is provided in the wall of the housing of the gun to permit insertion of one or more cartridges 14 into chamber 12. The cylindrical housing is formed of thermally insulative material such as silicon impregnated glass fiber or reinforced Teflon to maintain the surface of the gun at a relatively low temperature. The housing material also has non-stick properties so that the molten or partially melted adhesive will not adhere to the inside of the housing.

Attached to the forward end of the gun housing is a heater block 16 which includes on the side confronting chamber 12 a waffle-like array of projections 17 into engagement with which adhesive cartridge 14 is urged for rapid melting. Projections 18 define a plurality of communicating channels 19 through which liquid adhesive flows. A nozzle 20, having orifice 22 extending therethrough is affixed to the outer end of the heater block.

Nozzle 20 is threaded into heater block 16 by an externally threaded flange 200 having an internally threaded passage 202 therethrough communicating with orifice 22. A ball-check valve is disposed inside passage 202 and includes a compression spring 204, in compressed engagement with a ball 206 by means of an externally threaded member 208 having a passage completely therethrough. Member 208 is threaded into passage 202 of the nozzle of retain the valve assembly. When pressure is applied to the valve by molten adhesive driven by the plunger 46, ball 206 unseats from the seating surface of member 208 to permit adhesive to flow around ball 206 and through passage 202 to orifice 22 out of the nozzle 20 onto a work surface.

A passage 24 in block 16 provides a path extending from the bottom of the surface confronting chamber 12 for liquid adhesive to flow into a reservoir 26 provided in block 16. The passage 24 communicates through reservoir 26 with a passage 28 located above passage 24 in the outer end of block 16 and through which liquid adhesive flows through the ball-check valve and nozzle orifice 22 onto a work surface. The heater block 16 includes a removable cap 29 for the reservoir 26 and a removable nozzle 20 so that the passages in the heater block may be readily cleaned. The heater block 16 is formed of thermally conductive material such as aluminum and includes one or more electrical heater elements 30 disposed therein and energized from any convenient source of electricity by means of electrical leads 32 for heating the block and projections 18 to an operating temperature sufficient to melt the adhesive cartridge 14. A thermostat 34 is affixed to heater housing 16 by way of a flange 33 and serves to maintain the operating temperature of the block within a predetermined temperature range in a manner well known in the art. Electrical leads 32 are attached to the thermostat 34 by means of crimped connectors 35. The leads are combined in power cord 36 which passes through cord retainer 37 mounted in the butt of the gun handle. The cord retainer protects leads 32 from damage that could be caused by external pulling on the power cord 36. An additional thermally and electrically insulative enclosure 38 covers the thermostat 34 and its associated electrical connections and leads and is affixed at a front end to the heater block and at its rear end to a support member for the cylindrical gun housing 10 by means of screws 39.

The cylindrical gun housing 10 which supports heater block 16 and nozzle 20 is itself supported on a handle 40 by means of a cylindrical cap 42 cooperative with the rearward end of gun housing 10. The closed end 44 of cylindrical cap 42 forms a rear wall of chamber 12.

A plunger 46 is slidably mounted inside chamber 12 and is affixed to a connecting rod 48 which extends through an opening in the rear wall 44 of chamber 12 and out through handle 40 rearwardly of the gun. The cross section of the rod is preferably square. A knob 45 is provided on the distant end of rod 48 for manual retraction of plunger 46 for loading of the gun.

A ratchet means drives the plunger forward and includes a generally rectangular gripping plate 50 having a centrally disposed opening therethrough generally conforming to the shape of the rod and which rides on rod 48 rearwardly of wall 44. The opening is bell-mounted at the front and terminates at the rear in relatively sharp top and bottom edges 56 and 57. This type of ratchet mechanism is itself known and is shown, for example, in U.S. Pat. No. 1,986,166 as part of a caulking gun for dispensing materials at room temperature. Plate 50 has a pair of perpendicularly projecting rounded ears 51 which act as bearing surfaces for one end of compressing spring 52 which is also disposed around the connecting rod. The other end of spring 52 bears against rear wall 44. A trigger actuating lever 54, having finger guard 59, is pivoted on handle 40 by a pin 53 and includes a pawl 55 which engages gripping plate 50 below connecting rod 48. During the rearward travel of trigger 54, the gripping plate is cammed against the urging of compression spring 52 with its top and bottom edges 56 and 57 into engagement with the confronting surfaces of connecting rod 48 and urges the rod forwardly throughout the rearward travel of the trigger 54. Thus, plunger 46 is driven against cartridge 14 to cause its engagement with heater block 16.

A retraction mechanism is provided to allow the plunger to retract a predetermined amount upon release of the trigger. Riding on rod 48 rearward of the gun is a generally rectangular lever 60 having a centrally disposed opening therethrough generally conforming to the shape of the rod and having top and bottom rearward edges 68 and 69 confronting the rod and bell-mouthed front edges as in plate 50. Flange or link 64 extends rearwardly from the back of the gun handle 40 above rod 48 and is hinged to the upper end of lever 60 to provide support therefor. A spring means such as a rubber grommet or a piece of rubber tubing 66 is frictionally disposed about connecting rod 48 between the rear wall of handle 40 and the inside of lever 60 and operates to position lever 60 so that edges 68 and 69 engage rod 48 to restrain its retraction. When trigger 54 is released, gripping plate edges 56 and 57 maintain their engagement with rod 48 and rod 48 retracts under the influence of spring 52. Pawl 55 pivots clockwise and the opposing surface of plate 50 pivots counterclockwise as spring 52 bears against rounded ears 51 so as to reduce the bite of edges 56 and 57 against rod 48 during retraction. Retracting rod 48 drags grommet 66 with it until grommet 66 engages lever 60 causing it to pivot counterclockwise in FIG. 1, about support 64 until edges 68 and 69 grip rod 48 and stop the retraction. In the preferred embodiment, the axial length of grommet 66 is less than the distance between the rear wall of handle 40 and lever 60. The angular extent to which lever 60 is movable determines the amount of retraction permitted for a given central opening size in relation to the cross-sectional size of rod 48.

Figures 2, 2A:
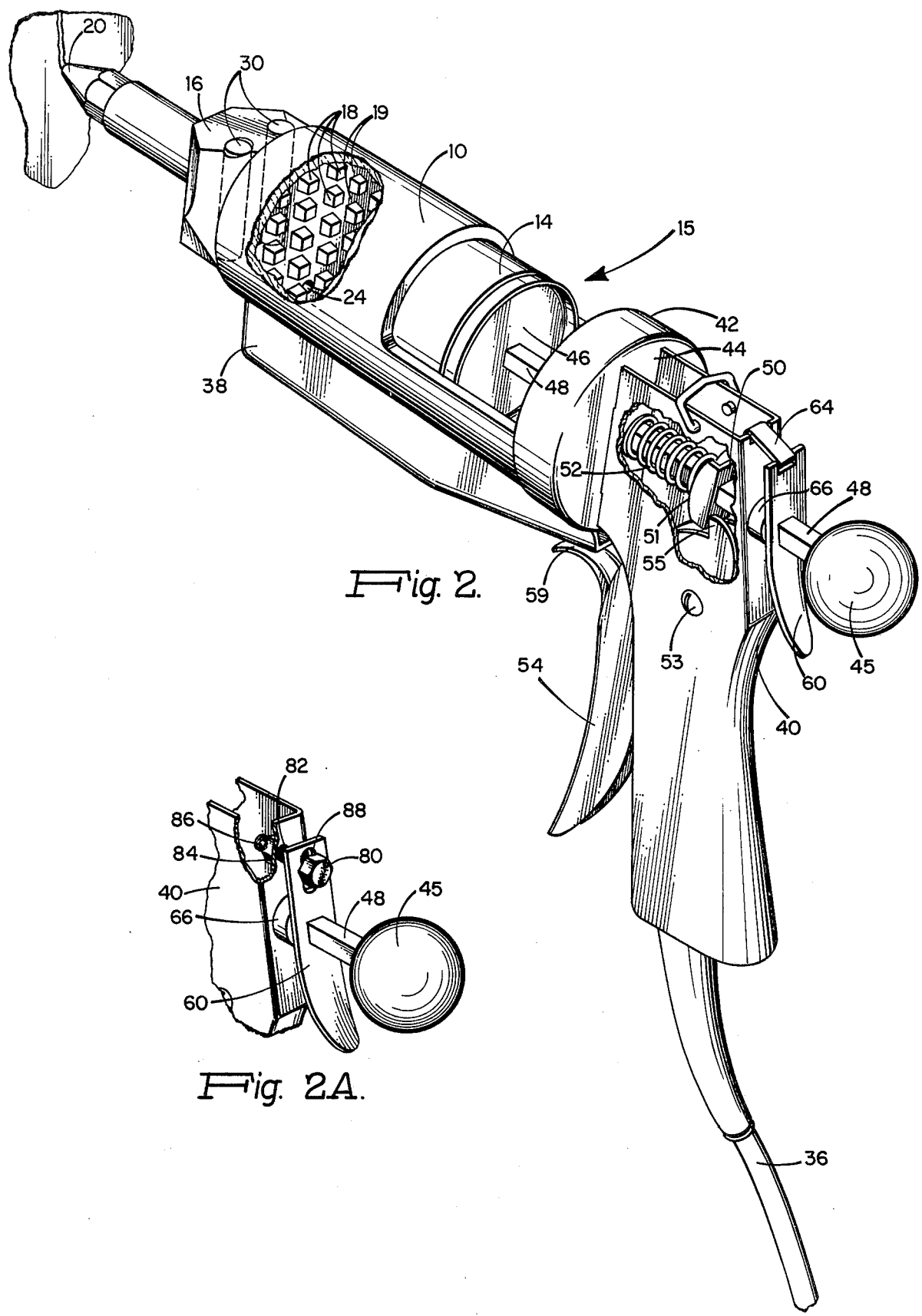
FIG. 2 is a partially cutaway perspective view of the adhesive gun.
FIG. 2A is a partially cutaway perspective detailed view of an alternative construction of the adhesive gun.

Alternatively, as shown in FIG. 2A, the support link for lever 60 may be a machine screw 80 or other suitable fastener such as a rivet affixed to the rear wall of handle 40. As shown screw 80 passes through an opening 82 and is threaded into nut 84 attached to the inside surface of the rear wall and locked in place by suitable locking means such as, for example, a solder joint 86. The upper portion of lever 60 is loosely yoked around screw 80 by means of a slot 88. The angular extent to which lever 60 is movable and hence the amount of permitted retraction may be adjusted by threaded screw 80 into or out of the nut 84, which adjustment is then fixed by locking screw 80 in its selected position.

Knob 45 is mounted on the end of the connecting rod 48 which has a length such that knob 45 engages lever 60 to limit the forward travel of plunger 46 to a predetermined position shown in phantom in FIG. 1, so that the plunger never comes in contact with liquid or partially melted adhesive and therefore remains clean. It will be remembered that the cartridge of thermoplastic adhesive is itself substantially thermally insulative so that the high temperature of the heating block is transmitted mainly to a relatively small portion of the cartridge 14 close to the heating block 16.

In operation, a cartridge 14 is inserted into chamber 12 of gun housing 10 through opening 15 and slid into engagement with heater block 16. Plunger 46 is brought into engagement with the rear surface of the cartridge. The heater is energized and after a warm-up period, the cartridge portion adjacent projections 18 begins to melt. The trigger 54 is actuated to compress gripping plate 50 against the compression spring 52 and into engagement with connecting rod 48 to force the plunger forward and to provide pressure for forcing the melted adhesive through lower passage 24 to fill reservoir 26. This pressure dislodges ball 206 from its seat on member 208 against spring 204 to open the ball-check valve and permit liquid adhesive to flow out of the reservoir through upper passage 28 and orifice 22 of nozzle 20 onto a work surface. Under the pressure applied by the piston, the transition section of the cartridge between the liquid portion and the solid portion expands to form a seal against back leakage of the liquid adhesive. Since the gun housing 10 is made of a non-stick material, there is no binding of cartridge 14 in chamber 12. During the initial forward movement of plunger rod 48, grommet 66 is dragged along with the rod until it abuts the rear wall of handle 40. The rod continues to move forward for the full rearward travel of trigger 54.

When the trigger is released, the rod begins to retract as previously described. During the initial rearward movement of rod 48, grommet 66 is dragged back until it abuts lever 60, causing it to pivot about support 64 until edges 68 and 69 grip the rod and stop the retraction. This retraction limiting means permits the rod to retract a predetermined amount to disengage the cartridge thereby permitting the ball-check valve to close and arrest the flow of adhesive at substantially the same time as the trigger is released, thereby minimizing wasteful and messy dripping. With the plunger retracted the pressure on the cartridge is relieved so that the check valve is closed and dripping from the nozzle minimized. In addition, retraction of the plunger prevents the partially melted portion of the cartridge from extruding back toward the plunger through the clearance space between the cartridge and the gun chamber wall. With the piston in the retracted position, molten adhesive is stored in the reservoir ready for substantially instantaneous dispensing when the plunger is again urged forward against the cartridge. The arrangement of the reservoir exit passage above the reservoir and the release of pressure on the reservoir fluid provided by retraction of the piston, permits the ball-check valve to close and the molten adhesive to be stored with a minimum of wasteful and messy dripping.

When plunger 46 reaches its maximum forward travel, the gun must be reloaded even though a substantial portion of the cartridge between the maximum forward travel position of the plunger 46 and the heater block 16 is, as yet, unmelted. The retraction limiting means is disengaged by pushing on thumb grip 62 at the lower end of lever 60 to compress grommet 66 and disengage the retraction mechanism so that the operator may pull back on knob 45 to slide the plunger out of engagement with the cartridge 14 toward the rear wall 44 of the chamber 12. A second cartridge is inserted and the handle is slid forward into engagement with the remaining portion of the previously inserted cartridge. Knob 45 is pushed forward so that plunger 46 engages the back of the second cartridge. The gun is now ready for operation wherein the second cartridge acts as a ram to urge the as yet unused portion of the first cartridge into engagement with the heater block.

FIG. 2 shows the overall appearance of the gum in use. The disposition of two heating elements 30 in the block 16 is clearly shown. The channels 19 formed between the projections from the waffle plate as shown in a cutaway portion of the front of the gun. The square cross-section of the rod 48 and the operation of the ratchet mechanism are shown respectively through opening 15 and a cutaway at the rear of the gun.

An embodiment of the invention is shown in FIGS. 3, 5 and 6 wherein the plunger rod 48 is gripped by upper and lower gripping blocks 70 and 72. Gripping block 70 has a gripping surface of a width substantially coextensive with the width of rod 48 and a length extending along the length thereof. Lower gripping block 72 has a curved gripping surface of a width substantially coextensive with the width of rod 48 and joining a flat surface confronting the lower surface of rod 48. The grpping blocks 70 and 72 are interconnected on each side by a link 74 and pivot pins 76 and 78. Lower gripping block 72 is pivotally cooperative with pivot pin 78 to provide eccentric rotational movement about pivot pin 78. A washer 79 is disposed between the gripping blocks and spring 52 for engagement of the spring during operation. The washer 79 is typically maintained within a recess provided in the forward surfaces of blocks 70 and 72 to maintain washer and spring alignment with respect to the gripping blocks. A camming surface 81 is cooperative with pawl 55 and trigger 54.

In operation, squeezing of trigger 54 causes forward movement of pawl 55 and corresponding eccentric rotational movement of block 72 about pivot pin 78 providing bearing engagement of the curved portion of block 72 with the confronting lower surface of rod 48, as shown in FIG. 6. Block 70 is caused to move into gripping engagement with the confronting surface of rod 48. The gripping action of blocks 70 and 72 is dependent upon the force applied to trigger 54; the greater the squeeze force on the trigger, the greater the gripping force between the blocks and the plunger rod. Since large area gripping is maintained between blocks 70 and 72 and rod 48, there is little opportunity for wear of the plunger rod and the gripping blocks. The possibility of cutting or scoring of the plunger rod by line or edge contact of the gripping plate 59 in FIG. 1 is substantially eliminated. Since the gripping blocks do not appreciably wear, the forward travel of pawl 55 remains substantially constant throughout the life of the gun.

During dispensing of adhesive from the gun nozzle, it is often preferable to bypass the thermostatic heater control and supply continuous power to the heaters for melting of the normally solid ahdesive. Especially during a long dispensing interval, the histeresis of the termostatic control can limit the available supply of melted adhesive and the cooling of the adhesive can occur during dispensing. The provision of continuous heating during a dispensing interval maintains the fluidity of melted adhesive and assures a ready supply of melted adhesive for dispensing from the gun.

Referring to FIG. 4, there is shown a heater control circuit for supplying power via a thermostatic switch 87 to electrical heaters 83 and 85. A bypass switch 89 is provided in shunt with thermostat 87 and is closed upon actuation of trigger 54. Typically, switch 89 is a microswitch disposed in the gun housing and closed by manual actuation of the gun trigger 54. In the event that thermostat 87 is energized, thus supplying power to heaters 83 and 85, closure of switch 89 will have no effect since power is already being supplied to the heaters. However, in the event that thermostat 87 is off, the closure of switch 89 by actuation of trigger 54 causes application of electrical power to heaters 83 and 85 to provide continuous heating for so long as the trigger is acutated. After a dispensing interval, switch 89 is opened through release of trigger 54 and normal thermostatic control resumes to maintain the heater block of the gun within a predetermined temperature range.

Various other modifications and alternative implementations can be made without departing from the true scope of the invention. Accordingly, it is not intended to limit the invention by what has been particularly shown and described, except as indicated in the appended claims.

What is claimed is:

1. A hot melt adhesive gun for use with a cartridge of normally solid thermoplastic adhesive, said gun comprising:
   a handle;
   a gun housing of thermally insulative non-stick material mounted on the handle and defining a chamber having an opening in a wall thereof for insertion of said cartridge, said chamber being sufficiently cool to retain said adhesive cartridge in substantially solid form;
   adhesive cartridge driving means disposed for slidable movement in said chamber through a predetermined distance and including a plunger rod extending through the rear wall of said chamber and rearwardly of said gun;
   infinitely resolvable ratchet means supported by said handle and in operative engagement with said driving means;
   an actuating trigger supported by said handle and coupled to said ratchet means and operative throughout its rearward travel to urge said driving means forward against said cartridge;
   retraction means disposed about said rod extending rearwardly of said gun and operative upon release of said actuating trigger to permit retraction of said driving means by a predetermined amount;
   nozzle means having a discharge orifice for molten adhesive;
   valve means communicating with the nozzle means and operative to open the nozzle orifice when the trigger is actuated;
   a heater block coupled to said nozzle means and disposed at the forward end of said chamber and including;
   a face confronting said chamber and into engagement with which the front of said adhesive cartridge is urged for melting;
   at least one electrical heating element disposed in said block for heating said block to an operating temperature sufficient to melt said adhesive in engagement with said face;
   a reservoir in said block for maintaining a quantity of molten adhesive therein;
   a first passage in said block coupling said face to said reservoir; and
   a second passage in said block coupling said reservoir at a level above the level of said first passage to said nozzle means;
   whereby when said drive means is urged against said cartridge, pressure is provided to deform a partially melted portion of said cartridge against the walls of said chamber to provide a seal against backflow of molten adhesive and to force molten adhesive through said first passage and said reservoir and to open said valve means to permit flow of molten adhesive through said second passage, and out through said nozzle; and whereby upon release of said actuating trigger, retraction of said driving means causes relief of pressure to permit closure of said valve means to minimize dripping of molten adhesive from said discharge orifice.

2. A hot melt adhesive gun according to claim 1 further including:
   means for disengaging said retraction means from said element; and
   means for moving said driving means rearwardly of said gun to permit reloading of the gun by insertion of a cartridge into the opening in the wall of said chamber.

3. A hot melt adhesive gun according to claim 1 wherein said heater block includes a thermostat mounted thereon for maintaining the operating temperature of said heating element substantially constant.

4. A hot melt adhesive gun according to claim 1 wherein said driving means includes a plunger disposed in said chamber and said plunger rod includes:
   a connecting rod connected to said plunger; and
   a knob disposed on the end of said connecting rod outside the gun;
   and said ratchet means includes a gripping plate having an opening therethrough said opening having a bell-mouthed forward end and a sharp edged rearward end mounted on said rod outside said rear wall of said chamber and coupled to said trigger.

5. A hot melt adhesive gun according to claim 1 wherein said retraction means includes:
   a retraction lever having an opening therethrough said opening having a bell-mouthed forward end and a sharp edges rearward end and riding on said connecting rod rearwardly of said gun;

means pivotally connecting one end of said retraction lever to said handle;

spring means coupled between said retraction lever and said handle and cooperative with said lever to permit retraction of said plunger by a predetermined amount when said actuating trigger is released thereby relieving the pressure of said plunger on said cartridge so as to allow the valve means to close and arrest the flow of liquid adhesive at substantially the same time that the actuating trigger is released.

6. The invention according to claim 1 wherein said heater block face includes:

a plurality of projections confronting said chamber and into engagement with which said adhesive cartridge is urged for melting, said projections defining a plurality of communicating channels;

said first passage in said block coupling the communicating channels to said reservoir.

7. A hot melt adhesive gun for use with a cartridge of normally solid, thermoplastic adhesive, said gun comprising:

a handle;

a gun housing of thermally insulative, non-stick material mounted on the handle and defining a chamber having an opening in a wall thereof for insertion of said cartridge into the chamber, said chamber being sufficiently cool to retain said adhesive cartridge in substantially solid form;

a nozzle means having a discharge orifice for molten adhesive;

check valve means communicating with nozzle means;

a heater block coupled to said nozzle means and disposed at the forward end of said chamber and including a face having a plurality of projections confronting said chamber and into engagement with which said adhesive cartridge is urged for melting, said projections defining a plurality of communicating channels;

at least one electrical heating element disposed in said block for heating said block to an operating temperature sufficient to melt said adhesive in engagement with said projections;

a thermostat mounted on said block for maintaining the temperature of said block substantially constant;

a reservoir in said block for maintaining a quantity of molten adhesive therein;

a first passage in said block coupling said communicating channels to said reservoir;

a second passage in said block coupling said reservoir at a level above the level of said first passage and said nozzle means;

a plunger disposed for slidable movement in said chamber through a predetermined distance for urging said cartridge into engagement with said projections;

a connecting rod connected to said plunger and extending through the rear wall of said chamber and rearwardly of said gun;

a gripping plate having an opening therethrough said opening having a bell-mouthed forward end and a sharp edged rearward end riding on said rod outside said rear wall of said chamber;

a compression spring surrounding said rod and disposed between said gripping plate and said rear wall of said chamber;

an actuating trigger supported by said handle and engaging said gripping plate and operative throughout its rearward motion to urge said gripping plate against said compression spring thereby causing said gripping plate to engage directly with said plunger rod against the action of said compression spring to propel said plunger rod and plunger forwardly throughout the rearward motion of the trigger thereby providing pressure to deform a partially melted portion of said cartridge against the walls of said chamber to provide a seal against backflow of molten adhesive and to force molten adhesive through said first passage and said reservoir and to open said check valve means and to force molten adhesive through said second passages, and out through said nozzle;

a retraction lever having an opening therethrough said opening having a bell-mouthed forward end and a sharp edged rearward end riding on said connecting rod rearwardly of said gun;

means pivotally connecting one end of said retraction lever to said handle;

spring means coupled between said retraction lever and said handle and cooperating with said lever to permit retraction of said plunger by a predetermined amount when said actuating trigger is released, thereby relieving the pressure of said plunger on said cartridge so as to allow the check valve means to close and arrest the flow of liquid adhesive at substantially the same time that the actuating trigger is released;

means for disengaging said retraction lever;

means rearwardly of said gun for retracting said plunger to permit reloading of the gun by insertion of a cartridge into the opening in the wall of said chamber.

8. A hot melt adhesive gun according to claim 3 further including a bypass switch closed upon actuation of said trigger and in electrical shunt connection with said thermostat to bypass said thermostat during actuation of said trigger, thereby to supply electrical power to said at least one electrical heating element irrespective of the state of said thermostat.

9. A hot melt adhesive gun according to claim 1 wherein said infinitely resolvable ratchet means includes:

a first gripping block having a substantially planar gripping surface disposed in confronting relation to a first surface of said plunger rod;

a second gripping block disposed on an opposite side of said plunger rod from said first gripping block and having a curved gripping surface in confronting relation to a second surface of said plunger rod;

first and second links each disposed on a respective side of said gripping blocks and pivotally connected thereto to permit gripping motion of the gripping surfaces of said blocks;

a cam surface provided on said second gripping block and cooperative with said actuating trigger to produce, upon actuation of said trigger, movement of the gripping surfaces of said blocks into large area gripping contact with the confronting surfaces of said plunger rod, the gripping force of said blocks on said plunger rod being related to the degree of actuating force applied to said trigger.

10. A hot melt adhesive gun according to claim 9 wherein said retraction means includes:

spring means disposed around said plunger rod and extending between a portion of said housing and said gripping blocks; and an annular washer disposed around said plunger rod and interposed between said gripping blocks and said spring means to provide alignment of said spring means with respect to said gripping blocks.

11. A hot melt adhesive gun for use with a cartridge of normally solid, thermoplastic adhesive, said gun comprising:

a handle;

a gun housing of thermally insulative, non-stick material mounted on the handle and defining a chamber having an opening in a wall thereof for insertion of said cartridge into the chamber, said chamber being sufficiently cool to retain said adhesive cartridge in substantially solid form;

nozzle means having a discharge orifice for molten adhesive and check valve means for selective opening of said orifice;

a heater block coupled to said nozzle means and disposed at the forward end of said chamber and including a face having a plurality of projections confronting said chamber and into engagement with which said adhesive cartridge is urged for melting, said projections defining a plurality of communicating channels;

at least one electrical heating element disposed in said block for heating said block to an operating temperature sufficient to melt said adhesive in engagement with said projections;

a thermostat mounted on said block for maintaining the temperature of said block within a predetermined temperature range;

a reservoir in said block for maintaining a quantity of molten adhesive therein;

a first passage in said block coupling said communicating channels to said reservoir;

a second passage in said block coupling said reservoir at a level above the level of said first passage and said nozzle means;

a plunger disposed for slidable movement in said chamber through a predetermined distance for urging said cartridge into engagement with said projections;

a connecting rod connected to said plunger and extending through the rear wall of said chamber and rearwardly of said gun;

first and second gripping blocks disposed on respective opposite portions of said connection rod and each having a gripping surface cooperative with a cooperating surface of said rod;

first and second links pivotally connected to said gripping blocks to permit gripping motion of the gripping surfaces of said blocks;

a cam surface on one of said gripping blocks;

a compression spring surrounding said rod and disposed between said gripping blocks and said rear wall of said chamber;

an actuating trigger supported by said handle and having a portion engaging said cam surface and operative throughout its rearward motion to urge said gripping blocks against said compression spring and to produce movement of said gripping surfaces into large area gripping contact with the confronting surfaces of said plunger rod to propel said plunger rod and plunger forwardly throughout the rearward motion of the trigger thereby providing pressure to deform a partially melted portion of said cartridge against the walls of said chamber to provide a seal against backflow of molten adhesive and to force molten adhesive through said first passage and said reservoir and to open said check valve means and to force molten adhesive through said second passages, and out through said nozzle;

a retraction lever having an opening therethrough said opening having a bell-mouthed forward end and a sharp edged rearward end riding on said connecting rod rearwardly of said gun;

means pivotally connecting one end of said retraction lever to said handle;

spring means coupled between said retraction lever and said handle and cooperative with said lever to permit retraction of said plunger by a predetermined amount when said actuating trigger is released, thereby relieving the pressure of said plunger on said cartridge so as to allow the check valve means to close and arrest the flow of liquid adhesive at substantially the same time that the actuating trigger is released;

means rearwardly of said gun for retracting said plunger to permit reloading of the gun by insertion of a cartridge into the opening in the wall of said chamber.

12. A hot melt adhesive gun for use with a cartridge of normally solid thermoplastic adhesive, said gun comprising:

a handle;

a gun housing of thermally insulative non-stick material mounted in the handle and defining a chamber having an opening in a wall thereof for insertion of said cartridge, said chamber being sufficiently cool to retain said adhesive cartridge in substantially solid form;

adhesive cartridge driving means disposed for slidable movement in said chamber through a predetermined distance and including a plunger rod extending through the rear wal of said chamber and rearwardly of said gun;

infinitely resolvable ratchet means supported by said handle and in operative engagement with said driving means and including:

a first gripping block having a substantially plannar gripping surface disposed in confronting relation to a first surface of said plunger rod;

a second gripping block disposed on an opposite side of said plunger rod from said first gripping block and having;

a curved gripping surface in confronting relation to a second surface of said plunger rod, and a planar surface confronting said second surface of said plunger rod and a curved gripping surface contiguous with said planar surface and disposed with respect to a pivot pin connected to said link to provide eccentric rotational movement about said pivot pin upon actuation of said trigger to cause large area gripping contact with the confronting surfaces of said plunger rod;

first and second links each disposed on a respective side of said gripping blocks and pivotally connected thereto to permit gripping motion of the gripping surfaces of said blocks;

a cam surface provided on said second gripping block and cooperative with said actuating trigger to produce, upon actuation of said trigger, movement of the gripping surfaces of said blocks into large area gripping contact with the confronting surfaces of said plunger rod, the gripping force of said blocks on said plunger rod being related to the degree of actuating force applied to said trigger;

an actuating trigger supported by said handle and coupled to said ratchet means and operative throughout its rearward travel to urge said driving means forward against said cartridge;

retraction means disposed about said rod extending rearwardly of said gun and operative upon release of said actuating trigger to permit retraction of said driving means by a predetermined amount;

nozzle means having a discharge orifice for molten adhesive;

valve means communicating with the nozzle means and operative to open the nozzle orifice when the trigger is actuated;

a heater block coupled to said nozzle means and disposed at the forward end of said chamber and including;

a face confronting said chamber and into engagement with which the front of said adhesive cartridge is urged for melting;

at least one electrical heating element disposed in said block for heating said block to an operating temperature sufficient to melt said adhesive in engagement with said face;

a reservoir in said block for maintaining a quantity of molten adhesive therein;

first passage in said block coupling said face to said reservoir; and a second passage in said block coupling said reservoir at a level above the level of said first passage to said nozzle means;

whereby when said drive means is urged against said cartridge, pressure is provided to deform a partially melted portion of said cartridge against the walls of said chamber to provide a seal against backflow of molten adhesive and to force molten adhesive through said first passage and said reservoir and to open said valve means to permit flow of molten adhesive through said second passage, and out through said nozzle.

13. A hot melt adhesive gun according to claim 12 wherein said second gripping block further includes:

a camming surface disposed on an opposite side of said pivot pin than said curved surface and below said pin;

and wherein said actuating trigger includes a pawl for engaging said camming surface to cause eccentric rotational movement of said second gripping block.

* * * * *